July 4, 1961 B. G. ZIMMERMAN 2,991,142
SCALE FACTOR RECORDING DEVICE FOR OSCILLOGRAPHIC RECORDERS
Filed June 18, 1959 3 Sheets-Sheet 3
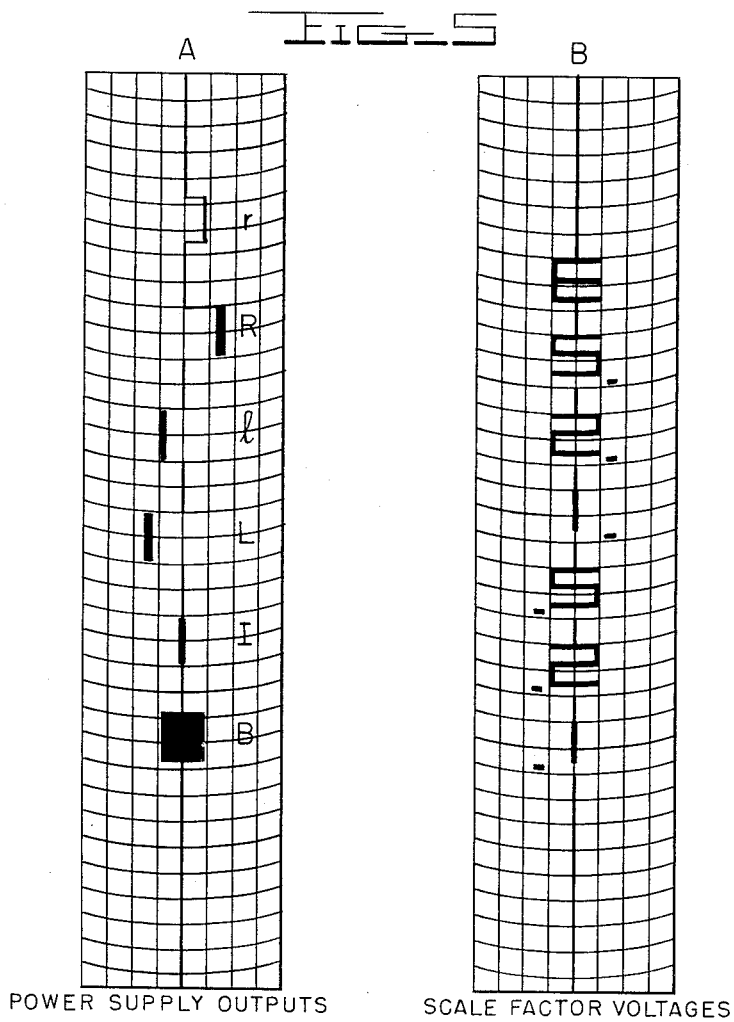
INVENTOR
BENJAMIN G. ZIMMERMAN
BY Richard C Reed
ATTORNEY

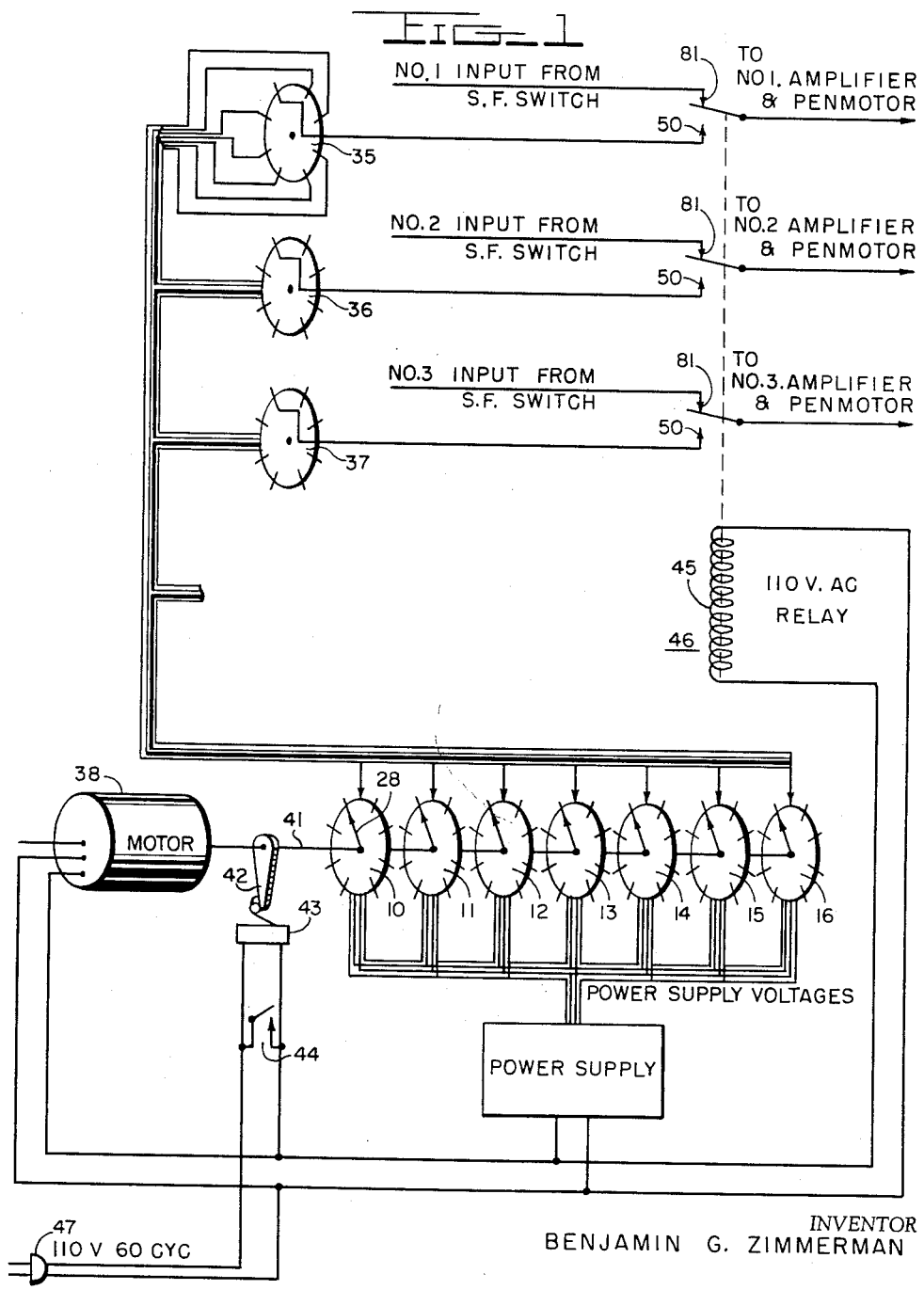

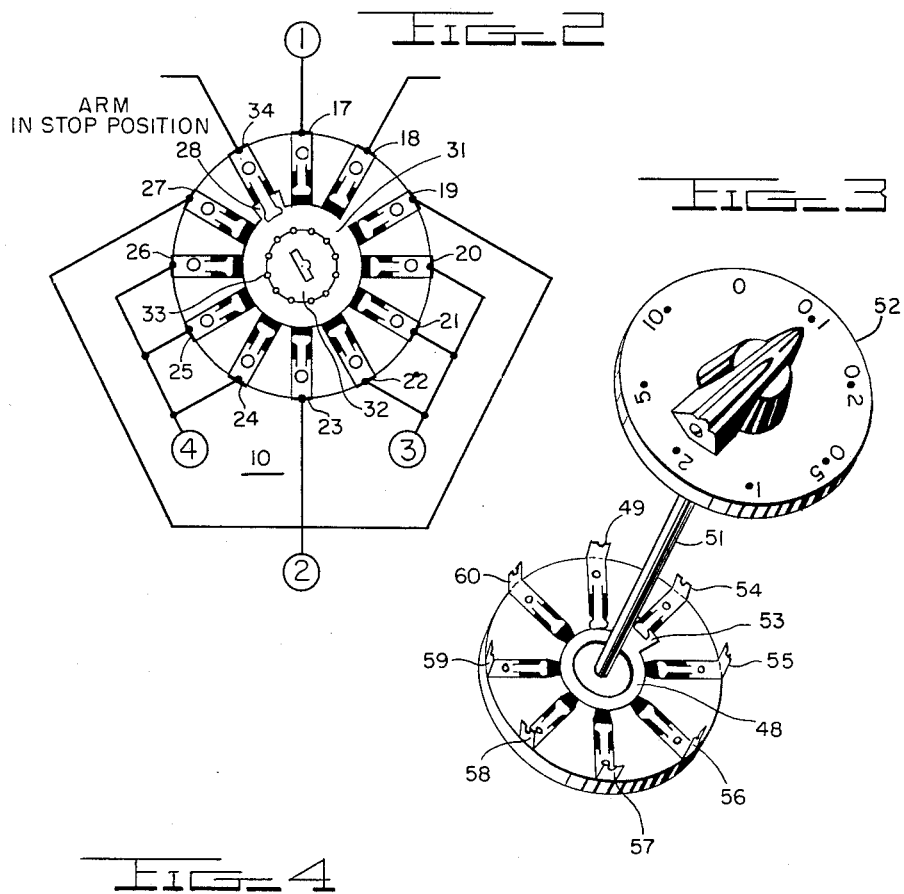
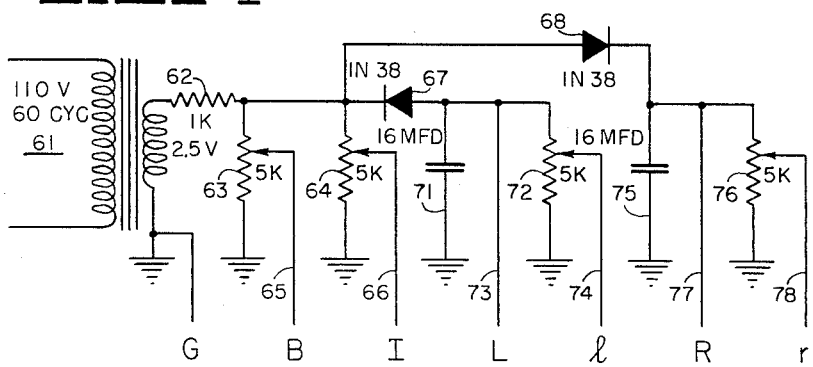

United States Patent Office 2,991,142
Patented July 4, 1961

2,991,142
SCALE FACTOR RECORDING DEVICE FOR OSCILLOGRAPHIC RECORDERS
Benjamin G. Zimmerman, 288 Cree Drive, Forest Heights 21, Md.
Filed June 18, 1959, Ser. No. 821,336
4 Claims. (Cl. 346—33)
(Granted under Title 35, U.S. Code (1952), sec. 266)

The invention described herein may be manufactured and used by or for the Government of the United States of America for Governmental purposes without the payment of any royalties thereon or therefor.

The present invention relates to oscillographic recorders and more particularly to a device for recording the scale factor settings of an oscillographic recorder directly onto the record chart.

Oscillographic recorders are of various types, thus, for the purposes of this invention, the device will be described for use with the type of recorder in which the record graph paper moves away from the recorder pens and the recorder pens are pivoted from a fixed point. The recording end of the pen moves across the paper to opposite sides of a center line in an arc to the center line to record on opposite sides of this center line depending on the voltage impressed upon the penmotor. If no voltage is applied to the penmotor the pen will record along the center line. The record paper is of the graphic type wherein a graphic presentation indicated by the lines on opposite sides of the center line represents the positive and negative voltages applied to the recorder by a voltage input. The recording pens or styli of this type of recorder can travel only a certain distance on opposite sides of the center line; therefore, it is necessary in recording high or low voltages to control the recording pen such that the pen will not go off the graph for high voltages and that the pen will move sufficiently to record low voltages. In controlling the recorder pen, an attenuator is put into the line in the form of a variable resistor in which the settings are indicated as scale factors. Accordingly, the scale factor becomes an operator to determine the actual voltage indicated by movement of the recorder pen. In use of the oscillographic recorders of the above mentioned type, the recorded lines indicated by the recorder graphically represent voltage. Therefore the scale factor used may indicate the number of divisions on the graph per volt or either the number of volts per division. For the purposes of describing the device of this invention, the scale factor used with the graphic presentation will indicate the number of graphic divisions per volt.

It is essential in solving a problem and determining the voltages graphically recorded that the scale factor be noted. If the scale factor is not noted, it will be necessary that the problem be rerun which requires operator time as well as extra run time on the equipment. Heretofore, it has been the practice for the operator to record the scale factors by writing the information on the chart before or after running the problem. Oftentimes, if the scale factors are not recorded before starting the record run, it is then forgotten at the end of the run and consequently the scale factors do not get recorded. Then the oscillographic recording is valueless. Thus a rerun is required in which the scale factors may still not be recorded if forgotten.

The present invention is directed to a device for semi-automatically or automatically recording the scale factors of an oscillographic recorder by associating a voltage selector switch with the scale factor selector switch. Suitable voltages are directed to the separate penmotors through separate voltage selector switches which receive the voltages from a separate power supply directed through separate commutators, one commutator for each different scale factor voltage. Each of the commutators has contacts which are connected with the power supply such that a sequence of voltages applied to the voltage selector switch will actuate the penmotor in accordance with a plan which will record a symbol representative of the scale factor. The device will record any scale factor which when written as a black letter is not a multi-valued function when viewed from the side, i.e.

1, 2, 3, 5, 7, can be recorded whereas 4, 6, 8, or 9 which involve multi-values cannot be recorded. In recording a multi-value number a symbol such as E, F, L, T, †, ‡, etc., can be used in place thereof. Any symbol can be written so long as the pen does not have to operate at two spots at the same time. In addition to the above symbols and numbers, the device can place a decimal point before or after the number or symbol to record tenths, etc.

It is therefore an object of the present invention to provide a device for recording scale factors for oscillographic recorders.

Another object is to provide a scale factor recorder device which can be adapted to an oscillographic recorder with very little modification of the present equipment.

Still another object is to provide a device for simply and accurately recording scale factor settings without any errors.

Other objects and advantages of the invention will hereinafter become more fully apparent from the following description of the annexed drawings, which illustrate a preferred embodiment, and wherein:

FIG. 1 illustrates a schematic diagram of the electrical circuitry,

FIG. 2 illustrates a single commutator and its electrical terminals,

FIG. 3 illustrates a voltage selector switch adapted to be connected to a scale factor selector switch, FIG. 4 illustrates a suitable power supply for applying selected voltages to each of the commutators, FIG. 5 illustrates the recordings made by a recorder for each of the separate outputs of the power supply, and symbols or letters recorded by different scale factor voltages, and FIG. 6 is a chart which illustrates the power supply output leads required to be connected with the designated commutator terminals to provide a recording of a particular symbol or number.

The device comprises a plurality of commutators arranged in linear alignment and each connected to a power supply in such a way that each of the commutators will feed specific voltages to a specific contact of a plurality of scale factor voltage selector switches in accordance with the voltages required for a penmotor to write or record a specific scale factor in accordance with the voltages received from the commutator. A low speed motor adapted to make one revolution by actuation of a switch is connected to a drive shaft which simultaneously rotates a rotatable contact of each of the commutators through one revolution. The rotatable contact connects with the contacts connected with the power supply lines to feed the different voltages to the scale factor voltage selector switches. The voltages from the voltage selector switches are then directed to their respective penmotors through a relay which is actuated by the motor start switch. The relay disconnects the inputs from the scale factor selector switches to the penmotor and inserts the scale factor voltages from the voltage selector switches to the penmotor. Thus, during the operation of recording the scale factors, the information through the scale factor selector switch will not be delivered to the penmotor.

Referring now to the drawings wherein there is shown a preferred illustration of the device of the present invention, FIG. 1 is a schematic drawing illustrating in simplified form the various parts of the invention. The device includes a plurality of commutators 10 through 16 in linear alignment, each of which has a plurality of separate contacts 17 through 27 secured near the periphery thereof. The contacts are formed such that their inner ends contact a rotatable contact 28 which makes electrical contact therewith as the rotatable contact passes. The rotating contact 28 is formed as an arm extending from a circular contact ring 31 which is secured to an insulating member 32 by any suitable means such as rivets 33. The circular contact makes continuous contact with a contact 34 on the periphery of the commutator similar to contacts 17–27 and which extends inwardly sufficiently to contact the circular contact to make a common contact through the circular ring with the contacts 17–27. The contact 34 is connected with an electrical conductor which leads to a specific contact on each of a plurality of scale factor voltage selector switches 35, 36 and 37 etc., only three being shown for simplification of the drawings. The number of scale factor voltage selector switches needed depends on the number of penmotor recorders used and the number of commutators needed depends on the number of scale factors used in the recording.

The center rotating contacts 28 of the commutators are driven by a low speed motor 38 through a drive shaft 41 which extends through each of the commutators to simultaneously drive each of the commutator contacts 28. The motor drive shaft has an arm 42 secured thereto which rotates with the shaft and is positioned to operate and open a normally closed switch 43 after the motor makes one complete revolution. A normally open starter switch 44 is connected in parallel with switch 43 in order to start the motor and rotate the arm past the normally closed switch. After the arm passes over the normally closed switch, the starter switch is released and the motor drive current is supplied through switch 43 to the motor until the arm contacts the switch and opens the circuit whereupon the motor stops.

Switches 43 and 44 are connected into a circuit which also energizes the coil 45 of a relay 46 in order to disconnect the inputs from the scale factor switches to the penmotor recorder and to insert the voltages from the scale factor voltage selector switches to the penmotor recorders. As shown, the power supply to the motor and relay is supplied through an electrical plug 47 which is adapted to be connected with any suitable A.C. power source, not shown. The scale factor voltage selector switches are similar to the commutators and a conductor from each of the contacts 34 of each of the commutators is connected with a specific contact on each of the voltage selector switches to supply the different voltages from the commutator through the specific contact of the scale factor voltage selector switch to the penmotor recorders. Each of the voltage selector switches has a conductive ring 48 which makes continuous contact with a common contact 49 through which the voltages are fed to a relay contact 50 and then to the penmotor recorder, not shown. Each of the scale factor voltage selector switches is connected by a shaft 51 through the center insulator member to a scale factor selector switch 52 such that when a scale factor selector switch is rotated to the proper setting the conductive circular contact 48 is rotated therewith such that the arm 53 extending from the circular ring makes contact with the properly selected contact 54, 55, 56, 57, 58, 59 or 60 on the periphery of the voltage selector switch.

In order to record the scale factor used, a commutator must feed an electric representation of the associated scale factor to a penmotor through a scale factor voltage selector switch. A commutator, as shown in FIG. 2, is arranged such that certain contacts on the commutator are connected with a particular terminal. As shown, the commutator center rotating contact 28 is in its normal position at contact 34 and going in a clockwise direction contact 17 is connected with terminal 1, contact 18 is not connected with a terminal and is therefore non-conducting. Contacts 19, 23 and 27 are connected to terminal 2, contacts 20, 21 and 22 are connected to terminal 3, and contacts 24, 25 and 26 are connected with terminal 4. It is seen that as the center contact is rotated clockwise, the center contact 28 will receive a signal through the following terminals in the following order; terminals 1, no terminal, 2, 3, 3, 3, 2, 4, 4, 4, and 2 and then back to the starting point at contact 34 which feeds each of the signals to the respective contact on the scale factor voltage selector switch as the contact 28 passes each of the contacts 17 through 27. In order to feed an electrical representation of a scale factor to each penmotor recorder, each of the commutators 10 through 16 must be supplied with appropriate voltage from a power supply wherein each commutator feeds an electrical representation for a particular scale factor to the scale factor voltage selector switch and then to the penmotor according to the setting of the scale factor selector switches.

As shown in FIG. 4, the power supply comprises a transformer 61 which reduces a supply current from 110 v., 60 cycles to a desired voltage. The voltage is then fed into circuitry which comprises an alternating current portion that supplies alternating current voltages to the commutators and to two different rectifying circuits of opposite polarity which are provided with a suitable filter condenser to give a specific A.C. ripple in their output lines to the commutators. The circuit shown is for recorders in which a positive voltage drives the recording pen to the right and a negative output will drive the penmotor recorder to the left of the center line on the graph.

The alternating current circuit includes a resistor 62 in series with two voltage dividers 63, 64 which are connected in parallel and connected with ground. Each of the voltage dividers has output taps 65 and 66 respectively which lead to the commutators to supply a certain A.C. voltage to provide different voltages to the penmotor. The positive and negative circuits are connected to the alternating current line at the same tap and are the same physically with the exception that the diodes 67 and 68 are connected in reverse to provide outputs of opposite polarity. The output circuit including diode 67 produces a negative current and includes a filter condenser 71 and a voltage divider 72 each of which are connected with ground. Output line 73 is connected between the condenser 71 and the voltage divider 72 and output line 74 is taken from a tap on the voltage divider. The output circuit including diode 68 produces a current of positive polarity and includes filter condenser 75 and a voltage divider 76 each of which is connected to ground. Output line 77 is connected between the filter condenser 75 and the voltage divider 76 and output line 78 is connected to a tap on the voltage divider 76. Output lines 73 and 77 have the same voltage outputs only of opposite polarity and output lines 74 and 78 have the same voltage output but of opposite polarity. The values indicated for the various parts noted in the drawing, FIG. 4, are illustrative of a preferred modification and the output voltages applied to the recorder are suitable to carry out the teaching of the present invention.

FIG. 5(A) illustrates by graphic presentation a recording made by one recorder for each of the outputs when applied separately and independently to a recorder. FIG. 5(B) illustrates by graphic presentation a recording by one recorder pen of different scale factors made by selecting different supply outputs and applying the outputs systematically to the recorder. As shown by FIG. 5(A), the voltage from output 65, letter B, is an alternating current and consequently makes a long line across the center line and as the paper moves forward the recorder pen will make a solid block. Output 66, letter I, has less applied voltage and the recorder doesn't move so far across the center line and makes a heavy line along the center line. Output 73, letter L, is a negative D.C. output whereby the recorder pen is moved to the left of the centerline and the A.C. ripple causes the pen to oscillate a small amount to give a heavy line as the paper moves. Output 74, letter *l*, is a negative D.C. of less voltage therefore the pen does not move over as far and the A.C. ripple again causes the pen to oscillate to make a line of less intensity than line L. Output 77, letter R, and and output 78, letter *r*, respectively, are the same as for L and *l* except the output is positive and consequently the recorder pen records on the right side of the graph.

The scale factor recordings are made by selecting a particular output for a particular length of time and applying the voltages successively to the recorder pen through a commutator and a scale factor voltage selector switch. The voltage selector switch selects the particular switch contact required to record the desired scale factor in accordance to the voltage fed the switch by a particular commutator.

In operation, the device is set up ready for recording scale factors by connecting specific power supply outlets to specific terminals for each of the commutators and then feeding the voltages from each of the commutators to specific contacts on the scale factor voltage selector switches. For example, assuming commutator 10 to be set up to feed the voltages required to record the scale factor the supply output L will be connected with terminal 1 to record the decimal and output supply I will be connected to terminals 2, 3 and 4 to record the 1 and a line will be run from common contact 34 on the commutator to contact 54 on the voltage selector switch.

In order to record the scale factor 5, it is necessary to use another commutator such as 11 and a conductor run from the common post 34 on the commutator to the contact 56 on each of the scale factor voltage selector switches. The supply output voltages required to be connected with the terminals of the commutator are: L to terminal 1; B to terminal 2; *r* to terminal 3; and *l* to terminal 4. As the contact 28 sweeps by the commutator contacts 17 through 27, the different supply output voltages will be applied to the pen recorder through the common contact 49 of the scale factor voltage selector switch. The other scale factors are formed accordingly in accordance with the chart shown in FIG. 6.

In order to record the scale factors, the scale factors for the recorders are set at their proper stations which in turn rotates the contact of the voltage selector switch to the proper contact. Switch 44 is closed which starts the motor and simultaneously operates the relay to disconnect the usual inputs to the penmotor and closes the contacts to the voltage inputs from the power supply outputs through the commutators and the scale factor voltage selector switches. The arm 42 secured to the motor drive shaft passes over the normally closed switch 43 to permit the switch to automatically close for continued operation of the motor upon release of the starter switch. As the motor rotates, the drive shaft rotates the commutator center contact 28 by each of the peripherical commutator contacts 17 through 27 and as the center contact 28 contacts successively the contacts 17 through 27 the appropriate power supply outputs connected to the commutator terminals 1 through 4 feeds the proper voltages to the scale factor voltage selector switch and on to the recorder to record the scale factor. Upon completion of one revolution by the motor, the arm 42 contacts switch 43 to open the switch to break the circuit to stop the motor and to deenergize the relay wherein the relay contacts then make contact with the usual inputs 81 to the penmotor recorder.

It is obvious from the above description that the teaching of the present invention of recording scale factors for oscillographic records can be carried out to record different symbols or figures for many purposes. For the purposes of illustration such oscillographic recorders can be used with a computer for recording the different voltages produced by the computer in solving a problem. In solving a computer problem it is essential to know the scale factors used; therefore, the teaching of the present invention could be applied to the scale factor settings of an oscillographic recorder used with a computer.

Obviously many modifications and variations of the present invention are possible in the light of the above teachings. It is therefore to be understood that within the scope of the appended claims the invention may be practiced otherwise than as specifically described.

What is claimed is:

1. An oscillographic recorder scale factor recording system which comprises a power supply means that produces a plurality of different supply output voltages, at least one scale factor voltage selector switch having selective inputs thereon, a penmotor recorder for each said scale factor voltage selective switch, a plurality of commutators each having a plurality of separate inputs electrically connected with selected output voltages of said power supply and an output of each of said commutators connected to a selected input of said scale factor voltage selector switch, each of said commutators operative to sequentially transmit differing sequences of selected output voltages of said power supply connected thereto to a selected input of said scale factor voltage selector switch, said scale factor voltage selector switch selecting by position said output from one of said commutators and transmitting said selected power supply voltages from said commutator output to said penmotor recorder, said penmotor recorder including a recording stylus operative under applied voltage to move said stylus across a record in accordance with the value of said selected voltages transmitted to said penmotor by said commutator whereby said penmotor records specific scale factors in accordance with said selected output voltages transmitted thereto from said power supply.

2. An oscillographic recorder scale factor recording system which comprises a power supply that produces a plurality of different supply output voltages, a plurality of commutators each having a plurality of separate input contacts electrically connected with selected output voltages of said power supply to produce differing sequences of voltages in the output of said commutator and an output contact operative to successively contact each of said voltage supply input contacts during one cycle of operation, at least one scale factor voltage selector switch having a plurality of different selector positions, a penmotor recorder for each said scale factor voltage selector switch, each of said different selector positions of said scale factor voltage selector switch connected with the output of one of said plurality of commutators to transmit to said scale factor voltage selector switch a selected sequence of output voltages from said power supply electrically connected with said commutators, each of said commutators operative to sequentially transmit said selected output voltages of said power supply connected thereto to a selected input of said scale factor voltage selector switch, said scale factor voltage selector switch transmitting said selected power supply voltages from said commutator to said penmotor recorder, said penmotor recorder including a recording stylus operative under applied voltage to move said stylus across a record in accordance with the value of said selected voltages transmitted to said penmotor by said commutator whereby said penmotor records specific scale factors in accordance with selected output voltages transmitted thereto from said power supply.

3. An oscillographic recorder scale factor recording system which comprises a power supply that produces a plurality of different supply output voltages, a plurality of commutators each having a plurality of circularly arranged input contacts extending radially near the periphery thereof and electrically connected with selected output voltages of said power supply to produce differing sequences of voltages in the output of said commutators and an output contact operative to successively contact each of said input contacts during one cycle of operation, at least one scale factor voltage selector switch having a plurality of selector positions, a penmotor recorder for each of said scale factor voltage selector switches, an input contact positioned at each of said selector positions of said scale factor voltage switch connected with the output of one of said plurality of commutators to transmit to said scale factor voltage selector switch a selected sequence of output voltages from said power supply connected electrically with said commutators, and an output in common with said plurality of contacts on said scale factor selector switch, means connected with each of said commutator outputs to sequentially transmit said selected power supply output voltages to said selected input contacts on said scale factor voltage selector switch, said scale factor voltage selector switch transmitting said selected supply output voltages to said penmotor recorder, said penmotor recorder including a recording stylus operative under applied voltage to move said stylus across a record in accordance with the value of said selected voltages sequentially transmitted by said commutator whereby said penmotor records specific scale factors in accordance with said selected output voltages transmitted thereto from said power supply.

4. In a scale factor recording device for an oscillographic recorder which comprises a power supply that produces a plurality of different supply output voltages, a plurality of linearly spaced axially aligned commutators each having a plurality of circularly arranged input contacts extending radially near the periphery thereof and electrically connected with selected output voltages from said power supply to produce differing sequences of voltages in the output of said commutators, a radially extending output contact on each of said commutators mounted on a common shaft and operative to successively contact each of said peripheral input contacts on said commutators, a motor comprising a drive connected to rotate said commutator output contacts through rotation of said common shaft, switch means operable by said motor drive for limiting said motor to one revolution of said commutator output contacts, at least one scale factor voltage selector switch having a selector means for selecting one of a plurality of different selector positions, a penmotor recorder for each of said scale factor voltage selector switches, an input contact positioned at each of said selector positions, each input of said scale factor voltage selector switch connected with the output of one of said commutators to transmit to said scale factor voltage selector switch the sequentially selected output voltages from said power supply connected thereto and a scale factor voltage selector switch output contact rotatable to selectively contact each of said scale factor voltage selector switch inputs, each of said commutator output contacts operative by said motor means to sequentially contact said separate commutator peripheral input contacts to sequentially transmit said selected supply output voltages to said selected input contacts of said scale factor voltage selector switch, said scale factor voltage selector switch operative to rotate said selector switch output contact to select said output volages from one of said plurality of commutators through one of said input contacts on said scale factor voltage selector switch to transmit said selected output voltages from said power supply, said penmotor recorder including a recording stylus operative under applied voltage to move said stylus across a record in accordance with the value of said selected voltages sequentially transmitted by said commutator whereby said penmotor recorder records specific scale factors in accordance with said selected output voltages transmitted thereto from said power supply by said commutator.

References Cited in the file of this patent

UNITED STATES PATENTS

| | | |
|---|---|---|
| 1,126,642 | Kinsley | Jan. 26, 1915 |
| 2,656,523 | Hodson et al. | Oct. 20, 1953 |
| 2,768,050 | Alden | Oct. 23, 1956 |